United States Patent [19]
Walenty et al.

[11] Patent Number: 5,646,849
[45] Date of Patent: Jul. 8, 1997

[54] METHOD FOR PROPORTIONALLY CONTROLLING THE BRAKES OF A VEHICLE BASED ON FRONT AND REAR WHEEL SPEEDS

[75] Inventors: Allen John Walenty, Macomb; Kevin Gerard Leppek, Rochester Hills; Alexander Kade, Grosse Pointe Woods, all of Mich.

[73] Assignee: General Motors Corporation, Detroit, Mich.

[21] Appl. No.: 513,191

[22] Filed: Aug. 9, 1995

[51] Int. Cl.⁶ .................................................. B60T 13/74
[52] U.S. Cl. ............................ 364/426.01; 303/9.62; 303/155; 303/186; 303/167
[58] Field of Search .................. 364/426.01; 303/9.62, 303/155, 167, 169, 186

[56] References Cited

U.S. PATENT DOCUMENTS

| | | | |
|---|---|---|---|
| 4,750,125 | 6/1988 | Leppek et al. | 364/426 |
| 4,835,695 | 5/1989 | Walenty et al. | 364/426.02 |
| 4,850,650 | 7/1989 | Eckert et al. | 303/9.62 |
| 4,916,619 | 4/1990 | Walenty et al. | 364/426.02 |
| 4,917,445 | 4/1990 | Leppek et al. | 303/100 |
| 4,969,756 | 11/1990 | Villec et al. | 388/815 |
| 5,163,743 | 11/1992 | Leppek et al. | 303/100 |
| 5,173,860 | 12/1992 | Walenty et al. | 303/426.03 |
| 5,234,262 | 8/1993 | Walenty | 303/111 |
| 5,320,421 | 6/1994 | Kade et al. | 303/110 |
| 5,390,992 | 2/1995 | Walenty et al. | 303/112 |
| 5,454,630 | 10/1995 | Zhang | 303/175 |
| 5,539,641 | 7/1996 | Littlejohn | 364/426.01 |
| 5,558,409 | 9/1996 | Walenty et al. | 303/10 |

FOREIGN PATENT DOCUMENTS

0 170 478  5/1986  European Pat. Off. .

OTHER PUBLICATIONS

Brake Adjuster Algorithm, Research Disclosure No. 32411, Published Apr. 1991.
Brake Fade Compensation Technique, Research Disclosure No. 31961, Published Nov. 1990.
Surface Adaptive Torque Release, Research Disclosure No. 30762, Published Nov. 1989.
Slip Command Brake Apply System, Research Disclosure No. 31955, Published Nov. 1990.
Vehicle Reference Over–Speed Normalization, Research Disclosure No. 31359, Published May 1990.
Method to Compensate for Velocity Dependent Compliance Variation in Drum Brakes, Research Disclosure No. 36801, Published Dec. 1994.
Adaptive Proportioning Fail–Safe, Research Disclosure No. 36621, Published Oct. 1994.
Adaptive Brake Proportioning, Research Disclosure No. 30755, Published Nov. 1989.

*Primary Examiner*—Michael Zanelli
*Attorney, Agent, or Firm*—Anthony Luke Simon

[57] ABSTRACT

An adaptive brake control method, for a motor vehicle with first and second front vehicle wheels and third and fourth rear vehicle wheels, is achieved according to the steps of: receiving an operator input brake command; responsive to a brake command function stored in memory and the operator input brake command, developing a rear brake position command; outputting the rear brake position command to a rear brake actuator; monitoring the first and second front wheel speeds and the third and fourth rear wheel speeds; responsive to the monitored first and second front wheel speeds and the monitored third and fourth rear wheel speeds, updating the brake command function stored in memory, wherein the brake position command table is adaptively updated and a front to rear brake proportioning of the vehicle is adaptively controlled to minimize a difference between the front and rear wheel speeds during braking.

10 Claims, 4 Drawing Sheets

METHOD FOR PROPORTIONALLY CONTROLLING THE BRAKES OF A VEHICLE BASED ON FRONT AND REAR WHEEL SPEEDS

This invention relates to an adaptive brake system control.

BACKGROUND OF THE INVENTION

In a conventional hydraulic brake system, front to rear brake proportioning is typically fixed by the hydraulic design of the brakes and proportioning valves in the brake system.

More recently, there have been proposals for various drive-by-wire brake systems in which front to rear proportioning need not be fixed by system hydraulics and can be controlled instead by an electronic controller operating on one or more brake actuators. Such systems allow dynamic front to rear brake proportioning, that is, brake proportioning that is not fixed, but can be adjusted during vehicle driving and/or braking to achieve a desired result.

SUMMARY OF THE INVENTION

An adaptive brake system control in accordance with the present invention is characterized by the features specified in claim 1.

Advantageously, this invention provides a motor vehicle adaptive brake system control with dynamic front to rear brake proportioning.

According to one example of this invention, brake system control is implemented by an electronic controller that receives a brake command from a brake pedal and develops a front brake command. A rear brake command is developed through position control of rear brake actuators through a rear brake command table. The function of the rear brake command table and the rear brake command output in relation to the front brake command is the proportioning between the front and rear brakes. The front to rear brake proportioning may be made dependent on various factors including vehicle speed so that, during any given stop, the front to rear proportioning at different points during the stop vary in a desired manner. Thus, a given dynamic proportioning function can be programmed into the controller through the rear brake table in its relationship to the front brake command control to provide a programmed-in dynamic proportioning result.

In yet a further advantage according to this invention, during a braking maneuver, various vehicle parameters, including the vehicle wheel speeds, are monitored and the monitored information is used to adaptively update the rear brake command tables so that the rear brake command table achieves, in relation to the front brake control structure, a desired front to rear proportioning result. Thus, advantageously, this invention not only allows a desired dynamic proportioning control of the braking to be programmed into the braking controller, but adaptively updates the brake controller in response to actual vehicle performance to insure that the resulting brake response conforms to the response desired by the system designer.

Advantages gained by examples of this invention include the adaptive compensation of the brake control to various vehicle loading conditions, to tire wear and to tire type.

Advantageously, in an example according to this invention, an adaptive brake control method, for a motor vehicle with first and second front vehicle wheels and third and fourth rear vehicle wheels, is achieved according to the steps of: receiving an operator input brake command; responsive to a brake command function stored in memory and the operator input brake command, developing a rear brake position command; outputting the rear brake position command to a rear brake actuator; monitoring the first and second front wheel speeds and the third and fourth rear wheel speeds; responsive to the monitored first and second front wheel speeds and the monitored third and fourth rear wheel speeds, updating the brake command function stored in memory, wherein the brake position command table is adaptively updated and a front to rear brake proportioning of the vehicle is adaptively controlled to mimimize a difference between the front and rear wheel speeds during braking.

DETAILED DESCRIPTION OF THE INVENTION

Figure 1:
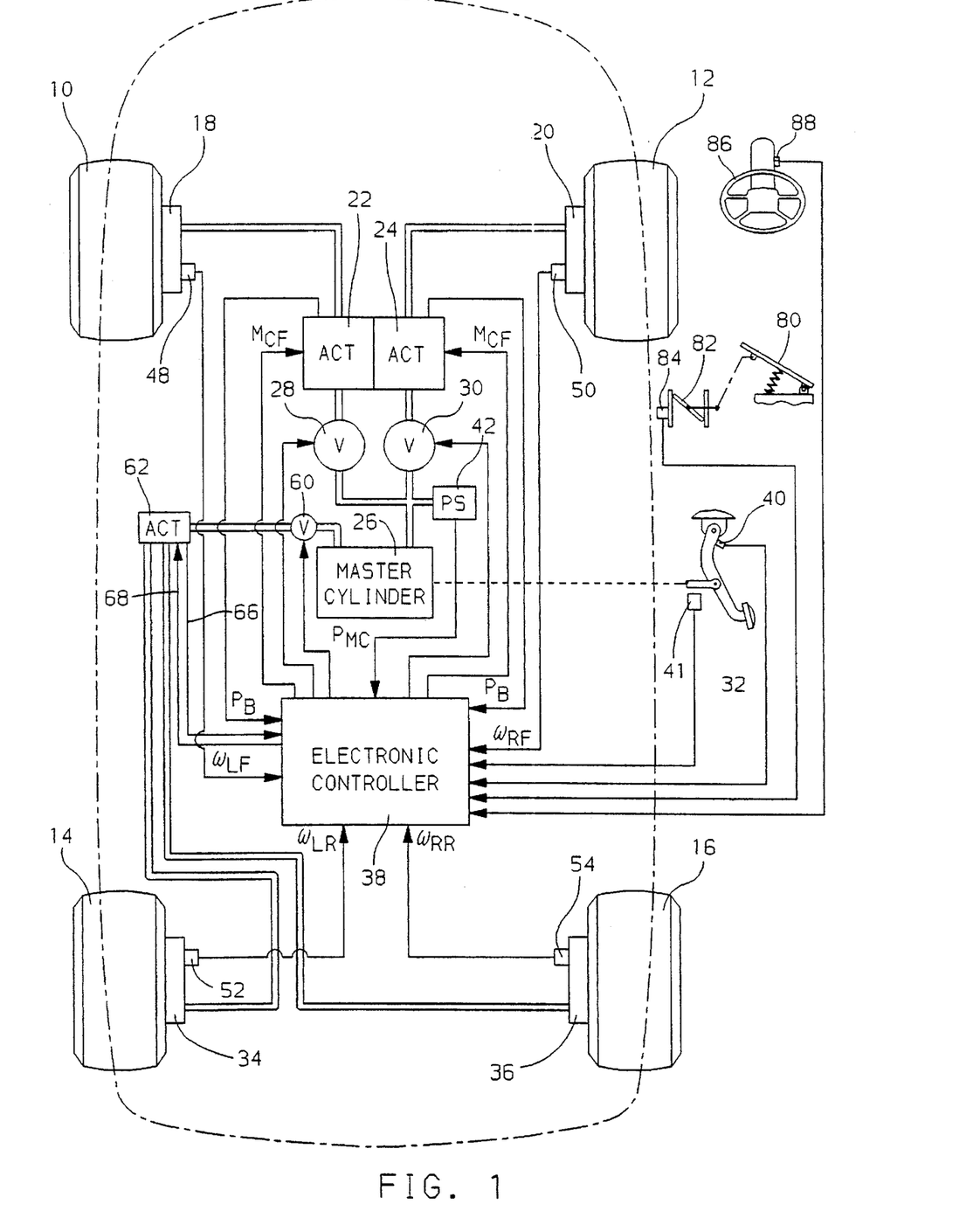
FIG. 1 illustrates, schematically, a vehicle with adaptive brake control according to this invention.

Referring to FIG. 1, the example vehicle braking system illustrated includes left and right front driven wheels 10 and 12 and left and right rear non-driven wheels 14 and 16. The front and rear wheels 10, 12, 14 and 16 have respective hydraulic actuated brakes 18, 20, 34 and 36 actuated by hydraulic pressure generated via respective electrohydraulic actuators 22, 24 and 62 (for both rear brakes 34 and 36). Each of the hydraulic brakes 18, 20, 34 and 36 are further hydraulically coupled to a conventional master cylinder 26 through respective normally opened electromagnetic valves 28, 30 and 60. Actuators 22, 24, 62 include a working chamber hydraulically coupled to the wheel brakes 18, 20, 34 and 36 and the valves 28, 30 and 60. In the preferred form of the invention, the electrohydraulic actuators 22, 24 and 62 each take the form of a brushless dc motor driven actuator wherein a motor is operated to control a piston for regulating the braking pressure (the motor for actuator 62 drives two pistons in parallel, one for each rear brake 34, 36). The brake torque is established at each brake 18, 20, 34, 36 at a value proportional to the position of each actuator piston and is reflected through the torque and/or output of the respective motor. For example, the electrohydraulic brake actuators 22, 24, 62 may each take the general form of the electrohydraulic actuator as described in the U.S. Pat. No. RE 33,557, which issued Mar. 19, 1991, assigned to the assignee of this invention. With exception to the modifications discussed below, the actuators 22, 24 and 62 may be operated generally as described in U.S. patent application, Ser. No. 08/355,468, filed Dec. 14, 1994, now U.S. Pat. No. 5,558,409, assigned to the assignee of this invention, the disclosure of which is incorporated herein by reference.

The master cylinder 26 is operated by a conventional vehicle brake pedal 32 in response to the foot pressure applied by the vehicle operator.

While as illustrated in FIG. 1, the rear wheels are braked by electrohydraulic actuator 62, the rear wheels may alternatively be braked by means of a pair of electrically operated brakes 34 and 36. Such brakes 34 and 36 may each take the form of an electronically operated drum brake in which the braking torque is established by operation of a dc torque motor. One example of such a brake is illustrated in the U.S. Pat. No. 5,000,291, issued Mar. 19, 1991, assigned to the assignee of this invention.

The front and rear brakes 18, 20, 34 and 36 are operated to establish a desired braking condition by means of an electronic controller 38. In general, the electronic controller 38 senses a braking command input by the vehicle operator by sensing the state of a conventional brake switch 40 which provides a signal when the vehicle operator applies pressure to the brake pedal 32. When the brake switch input is sensed, the electronic controller 38 operates the electromagnetic valves 28, 30 and 60 to close off the hydraulic communication between the master cylinder and the electrohydraulic actuators 22 and 24. This effectively isolates the wheel brakes 18, 20, 34 and 36 from the master cylinder 26 such that the hydraulic pressures at the wheel brakes are controlled solely by means of the electrohydraulic actuators 22, 24 and 62. The degree of braking effort commanded by the vehicle operator is sensed by means of a pedal position sensor 41 and a pressure sensor 42 monitoring operator depression of pedal 32 and the hydraulic pressure output of master cylinder 26, respectively. As is well known, the hydraulic pressure output of the master cylinder 26 is directly proportional to the applied pressure to the brake pedal 32 controlling the position of the master cylinder 26 and the position output of sensor 41.

Both the pedal position and the pedal pressure may be used to determine the operator requested brake effort command. In response to the brake effort command, the electronic controller 38 provides for establishing a desired brake torque at each of the wheels 10, 12, 14 and 16 via the respective brakes 18, 20, 34 and 36 by commanding motor current to each actuator 22, 24 and 62 to establish the actuator position, and therefore the brake pressure, for each brake 18, 20, 34 and 36 at a desired level related to the brake effort command. The commands generated by electronic controller 38 implementing the adaptive brake control according to this invention are also responsive to the outputs of wheel speeds as measured by wheel speed sensors 48, 50, 52 and 54. The commands generated by electronic controller 38 may also be responsive to the output of throttle position sensor 84, which provides an output signal indicative of the position of engine throttle 82, controlled by accelerator pedal 80. The commands generated by electronic controller 38 may also be responsive to steering wheel angle sensor 88, which provides an output signal indicative of the angular displacement from straight ahead center of steering wheel 86.

The actuator position feedback provided by the actuators 22, 24 and 68 used in a standard commutation control to control the switching of the dc brushless motors provide closed-loop brake actuator position control in accordance with the like control described in the pending U.S. patent application, Ser. No. 08/355,468.

The electronic controller 38 has an internal microprocessor that runs a control routine stored in permanent memory to develop position commands for the front actuators 22, 24 and the rear actuator 62 to effect a desired adaptive front to rear brake proportioning according to this invention. The adaptive proportioning according to this invention results in the distribution of braking force between the front and rear wheels to match the normal (perpendicular to the road) forces on the front and rear wheels. The controller 38 achieves this control without the use of sensors to directly measure brake torque and normal force, implementing instead an advantageous use of wheel speed data.

Figures 2, 3, 4:
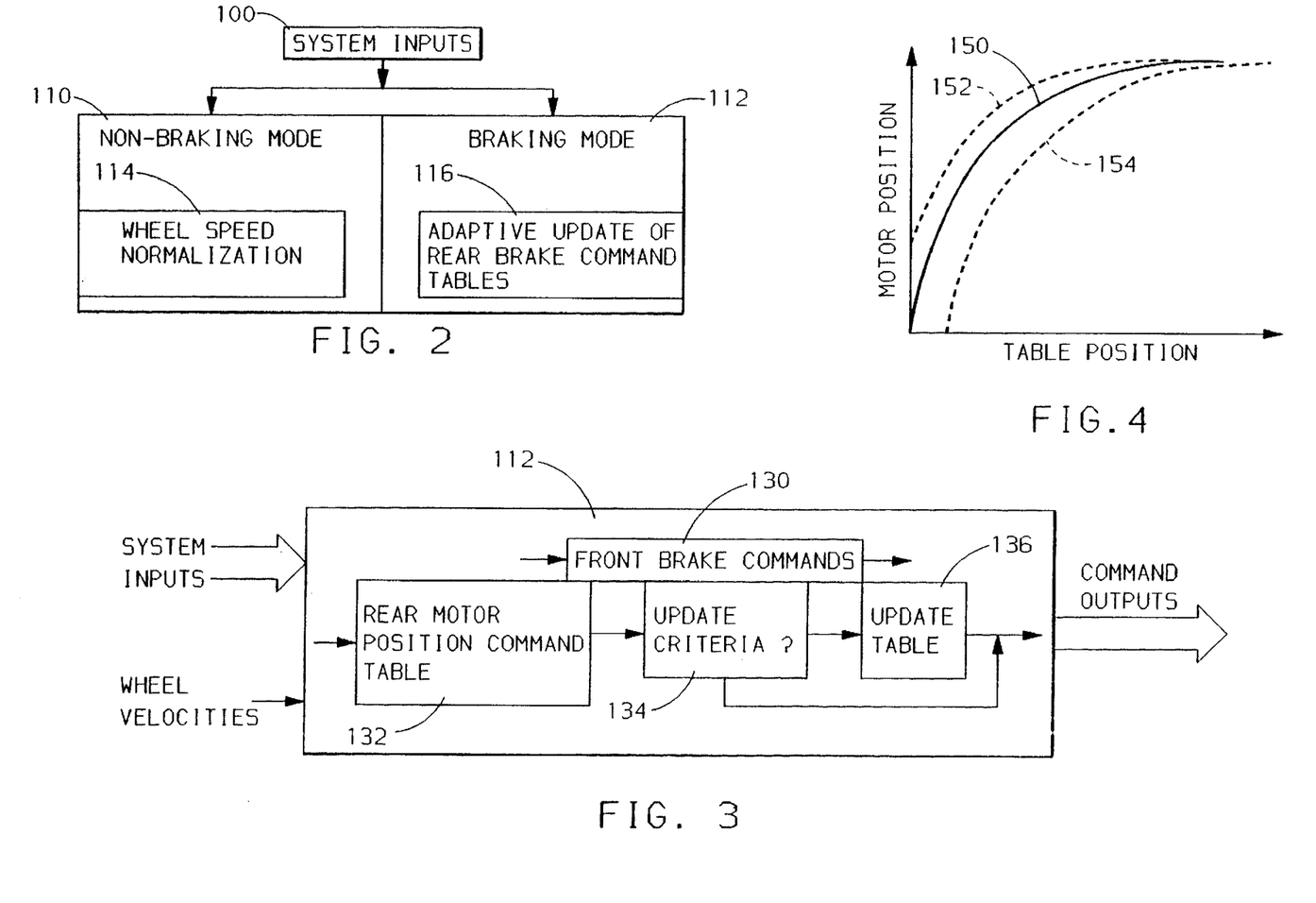
FIG. 2 illustrates schematically the flow of this invention.
FIG. 3 illustrates schematically the flow of this invention in braking mode.
FIG. 4 is an example graph of a rear brake command table.

More particularly, referring now also to FIG. 2, the controller 38 uses fie wheel speed data to adaptively control front to rear brake proportioning based on the assumption that two wheels, rotating at the tame speed on the same vehicle must, if they are slipping on the road surface, have the same mount of slip. To operate on this assumption according to this invention, the measured wheel speeds must be carefully normalized. Thus, in FIG. 2, the control of this invention, responsive to the system inputs, designated generally by block 100 to include all of the system inputs referred to herein, operates in two modes, non-braking mode 110, when the vehicle is not braking, and braking mode 112, when the vehicle is braking. A wheel speed normalization control 114 is run during the non-braking mode 110 and performs the normalization of the measured wheel speeds required to use the assumption that wheel speed information is representative of wheel slip.

More particularly, in the non-braking mode 110, the controller 38 continuously monitors and normalizes the wheel speed data to allow the front and rear wheel speed data to be compared. The normalization removes speed errors caused by tire pressure, tire wear, tire size and the tire style (including the presence of spare or mismatched tires). This calibration is done during periods of constant speed while the vehicle is traveling between predetermined minimum and maximum read speeds, i.e., between twenty and eighty miles per hour. A normalization factor for each wheel is established by dividing the sum of each individual wheel speed over a time period by the sum of all wheel speeds over the same time period. For example:

$$N_i = \Sigma S_i(t)/(\Sigma(S_1(t)+S_2(t)+S_3(t)+S_4(t))) \text{ for } t=0 \text{ to } T,$$

where T is the number of measurements summed and i equals 1, 2, 3, 4 for the left front right from, left rear and right rear wheels, respectively. In general, normalization of wheel speeds during non-braking vehicle operation for brake and/or traction control is known to those skilled in the art.

To avoid the effects of tire deformation, calibration of the normalization factors are performed only under ideal conditions. For example, the normalization does not take place if the brake switch is activated or if the vehicle is not traveling at a velocity constant within +/−Kvel, where Kvel is a predetermined constant. The normalization does not take place if the vehicle speed is not between a predetermined minimum and maximum, for example, 20 and 80 miles per hour. The normalization does not take place if the vehicle is in a turn that can induce the effects of vehicle lateral acceleration on the vehicle wheels. This can be determined by comparing the measured steering wheel angle to a calibratable limit, Kturn, or by detecting a difference between left and right wheel speeds of the undriven wheels greater than a predetermined threshold.

The normalization does not take place if any of the vehicle wheels are traveling over bumps that effect the wheel speed information. This can be determined by comparing, for each wheel, the present verses the immediately preceding wheel speed information to a calibratable threshold Kjitter*Vveh, where Kjitter is a constant or a table based value that increases with vehicle speed and Vveh is the vehicle velocity. The normalization does not take place if the vehicle is experiencing lateral acceleration that can effect wheel speed information. This is detected by determining the difference between the sum of the two left vehicle wheels and the sum of the two right vehicle wheels and comparing that difference to a threshold Klftrt*Vveh, where Klftrt is a predetermined constant. The normalization does not take place if the vehicle is experiencing longitudinal acceleration that can affect wheel speed information. This is detected by determining the difference between the sum of the front wheel speeds and the rear wheel speeds and comparing that difference to a threshold Kfrntrr*Vveh, where Kfrntrr is a predetermined constant. The normalization does not take place if the vehicle is traveling at a velocity near the upper velocity limit and accelerating or if the vehicle is traveling at a velocity near the lower velocity limit and decelerating. This is detected by comparing the throttle position to Kthrthi*Vveh and Kthrtlo*Vveh, respectively, where Kthrthi and Kthrtlo are predetermined constants. Also, the normalization does not take place if the vehicle traction control (to limit wheel slip during vehicle acceleration) or anti-lock brake control is active.

After the calibration is complete, the change in the normalization factor is compared to a maximum limit. If the change in the normalization factor exceeds the maximum limit, the new normalization factor is limited to the previous normalization factor plus or minus the maximum limit. This prevents the normalization factor from being changed too quickly by invalid data. After the normalization factor is determined, the process is repeated as long as the vehicle is in non-braking mode.

In addition to the assumption that the wheel speed velocity for front and rear wheels is the same for a given amount of slip, this invention also operates on the assumption that the coefficient of friction between front wheels and the road and the rear wheels and the road are the same. Since not all road conditions meet this criteria, the adaptive update of the brake control is performed only during select driving and road conditions, as will be explained below. When the vehicle is in the select driving and road conditions, the assumption that the coefficient of friction between each wheel and the road is the same as between the other wheels and the road is valid and leads to the conclusion that the amount of braking force at each wheel is directly proportional to the normal force between each wheel and the road. Stated in another way, with valid wheel speeds provided by the normalization routine, and with the select driving and road conditions, by forcing all of the wheel speeds to be identical during braking, the braking torque is proportioned so that each wheel is providing braking torque based on the normal force between that wheel and the road. In an example implementation, the system is calibrated to assure that the rear wheel speeds are slightly higher than the front wheel speeds.

Thus, in the braking mode 112, this invention uses a selection criteria and wheel speed information to adaptively proportion (block 116) the brake force distribution between the front and rear wheels so that brake force is proportioned according to the load on the vehicle wheels and so that wheel speeds are forced to be substantially identical, providing the maximum efficient brake force distribution.

Referring now to FIG. 3, the general operation of the braking mode 112 is shown. The braking mode 112 is responsive to the various system inputs discussed herein, including the wheel velocities, and develops a from brake command at block 130 responsive to the various inputs. An example position control of the front brakes and development of the commands thereof is set forth in pending U.S. patent application Ser. No. 08/355,468, filed Dec. 14, 1994, now U.S. Pat. No. 5,558,409. The rear brakes are operated responsive to a pedal command, PC, determined responsive to brake pedal travel and master cylinder pressure in the manner described in the above-mentioned copending patent application Ser. No. 08/355,468.

The pedal command is input to the rear motor position command table 132, which develops a rear motor position command used to control the rear brake actuator. The rear motor position command table is stored in EEPROM according to an initial table stored in ROM designed to provide, together with the front brake command control 130, the desired front to rear brake proportioning. The rear motor position table comprises, indexed in consecutive table positions, a series of motor position commands. The position commands are calibrated from a desired brake torque response through simple experimentation in a prototype vehicle in a manner within the level of those skilled in the an given the information within this specification. The shape of the calibrated table defines the predetermined table shape function used during the adaptive updating of the table according to this invention. During vehicle operations, the rear motor position command table is transferred from EEPROM to active RAM and is adaptively updated so that actual vehicle performance achieves the front to rear braking desired by the system designer. Thus, in addition to determining a rear motor position command at block 132, the rear brake control includes block 134, which, responsive to the various system inputs, determines if the vehicle operating conditions meet the criteria for adaptive modification to the rear motor position command table.

If the update criteria is passed at block 134, the rear brake control adaptively updates the rear motor position command table at block 136 to achieve the desired results of equal wheel speeds and equal slip of all vehicle wheels during non-ABS vehicle braking. Referring to FIG. 4, trace 150 illustrates an example table position versus motor position function of the rear brake position command table stored in ROM memory. Traces 152 and 154 illustrate possible adapted table position versus motor position functions laterally displaced from table 150 in response to the adaptive control according to this invention. As can be seen the curve fit operation of this invention ensures that traces 152 and 154 have substantially the same shape as trace 150.

The control according to this invention uses conditional normalization and acquisition steps to adaptively update the table that generates the front to rear proportioning commands. The control further uses predetermined brake table shaping to accelerate the correction of all table positions during adaptive updates and to guard against non-linearities and invalid table data. As will be appreciated by those skilled in the art having read this specification, variations in vehicle loading, such as due to changes in the number of vehicle passengers or the amount of cargo in the vehicle, can result in variations in the normal force loading of the vehicle wheels. By adaptively updating the rear brake command table responsive to the actual operating conditions, this invention adaptively controls the brakes to maintain the desired front to rear proportioning despite variations in loading of the individual vehicle wheels.

Figure 5A:
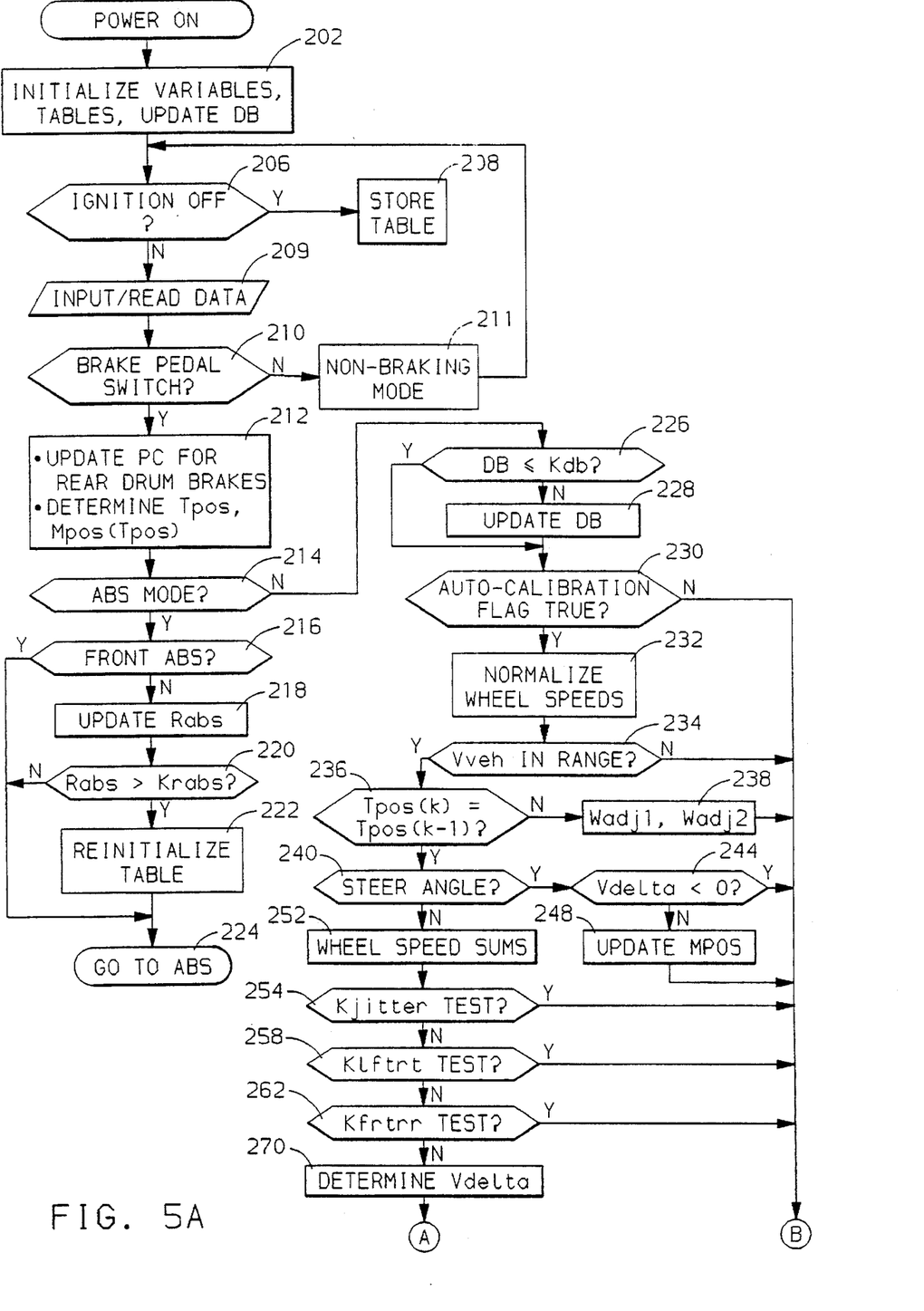
FIGS. 5A and 5B illustrate an example flow diagram implementing this invention.
Figure 5B:
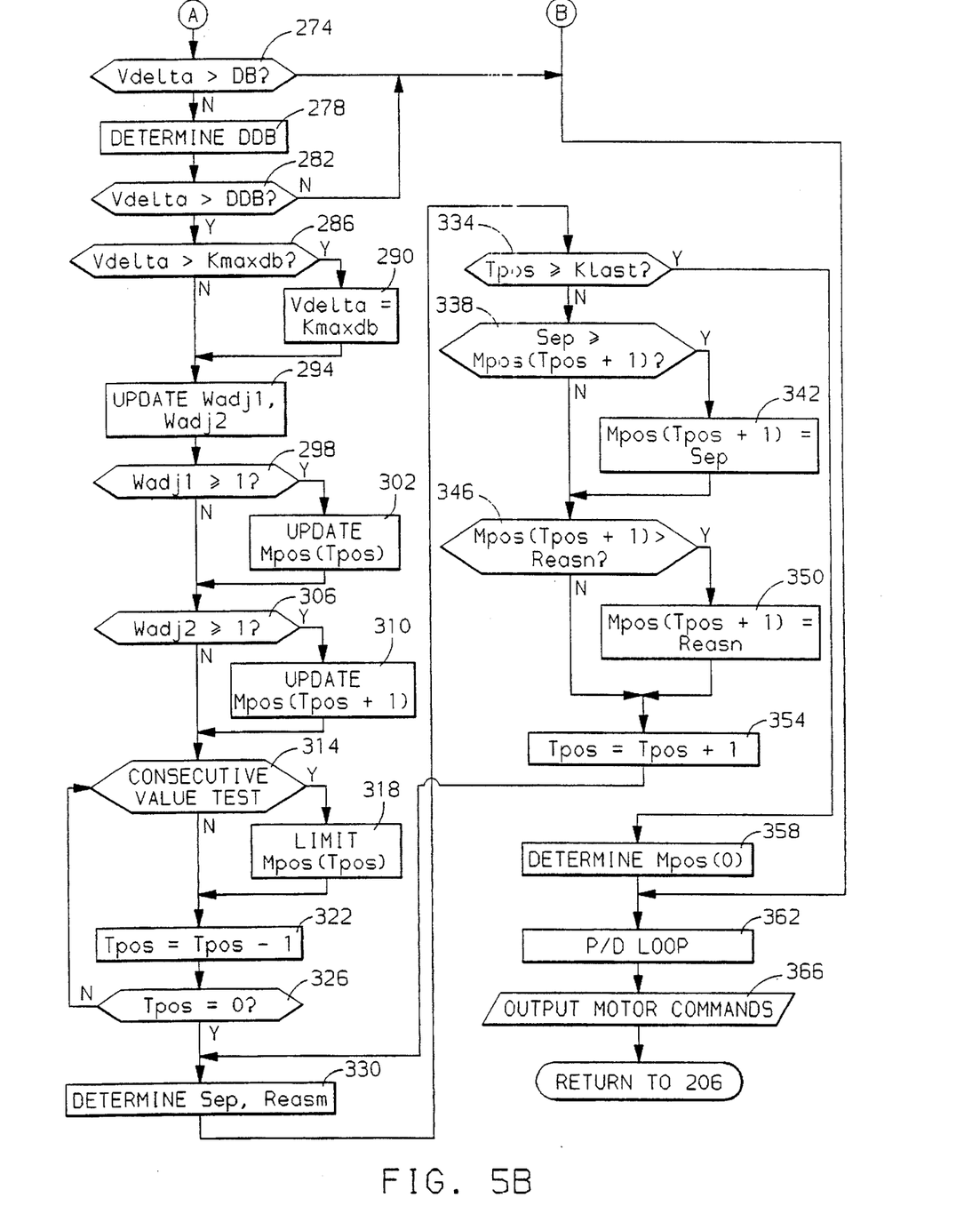

Referring now to FIGS. 5A and 5B, the example brake control according to this invention shown uses the normalized wheel speeds, determined during the non-braking mode and as further normalized responsive to vehicle load shift during braking as described in copending U.S. patent application, 08/513,192 filed concurrently with this invention, assigned to the assignee of this invention and having a disclosure incorporated herein by reference. The routine begins when the vehicle ignition is powered on and moves to block 202 where the system is initialized according to known techniques, the rear brake tables are loaded from EEPROM into RAM and the delta speed error dead band, DB, is increased by a constant Kfade. The delta speed error dead band, DB, is used to compensate for the variation of the coefficient of friction of the brake lining with brake lining temperature. The routine estimates the brake lining heat index by adding the term Kfade to DB.

Not shown in FIGS. 5A and 5B are the steps of determining the front brake commands and the pedal command PC. However, any suitable front brake control may be implemented, with the understanding that the function of the rear brake command table, in relation to the front brake control and command PC that is implemented, determines the default front to rear brake proportioning. A suitable example front brake control is set forth in the above mentioned pending U.S. patent application, Ser. No. 08/355,468.

At block 206, the routine checks whether the vehicle ignition has been powered off. If the vehicle ignition has been powered off, the routine moves to block 208, there the rear brake tables in the EEPROM are updated. The tables in the EEPROM are updated as follows. Each rear brake table value in RAM is compared to the previously stored value in EEPROM, values that are less than the corresponding EEPROM table values are stored into the EEPROM replacing the previous EEPROM table values, values that are greater than the corresponding EEPROM values are averaged with the corresponding EEPROM values and the result replaces the previous EEPROM value as the new EEPROM value. By averaging table values greater than the corresponding EEPROM values with the corresponding EEPROM values, the routine prevents brake fade or temporary heavy vehicle loading from creating a rear bias condition at the next vehicle start-up.

If, at block 206, the ignition is not off, then the routine moves to block 209 where various vehicle parameter data is input from the controller input circuitry or read from memory. This data includes the normalized wheel speeds of the four wheels, the brake pedal position, the brake pedal pressure, the steering wheel angle, the brake actuator motor positions, the vehicle deceleration rate and the pedal command, PC.

At block 210, the routine checks the signal from the brake pedal switch to determine if the vehicle operator is commanding a brake command. If there is no brake command, the routine proceeds through a series of operations that normalize the measured wheel speeds (block 211). This normalization of wheel speeds is done in the manner described above in reference to the non-braking mode.

If there is a brake pedal command at block 210, the routine moves to block 212 if the vehicle has rear drum brakes. At block 212, the pedal command, PC, for rear drum brakes is adjusted based on a velocity dependent compliance variation according to:

$$PC=PC+((Vveh*Kbrkfctr)*Kfluidvolume),$$

where Vveh is the vehicle velocity, Kbrkfctr is a constant for the drum brake and Kfluidvolume is a constant that represents the fluid volume of the particular drum brake used. The velocity dependent compliance variation is disclosed in Research Disclosure, No. 36801, published Dec. 10, 1994.

Also at block 212, the routine begins determining the motor position that achieves the required rear proportional brake line pressures by interpolating the rear brake table. The table position, Tpos, is obtained by dividing the pedal command by the factor Ktpos, which yields a number between zero and the highest table position at full pedal command. The relative percent between table positions is calculated by dividing the remainder of the equation PC/Ktpos by Ktpos to determine Rperc. The rear motor position command is formed by looking up from the rear brake table the motor position located at Tpos, Mpos(Tpos). Also the motor position Mpos(Tpos+1) is retrieved. The routine determines the difference between Mpos(Tpos+1) and Mpos(Tpos), multiplies that difference by Rperc and adds the result to Mpos(Tpos) to determine the position command MPOS.

At block 214, the routine determines, in a manner well known to those skilled in the art, if any of the four vehicle wheels are in an anti-lock brake (ABS) mode. In general, a wheel is controlled to be in ABS mode if its wheel slip is greater than a predetermined threshold. If none of the wheels are in ABS mode, then the routine continues to block 226. If at block 214 any of the wheels are in ABS mode, the routine continues to block 216 where it determines if either of the front wheels is in ABS mode. If at block 216 either of the front wheels is in ABS mode, the routine continues to block 224 where an ABS control routine of any suitable type known to those skilled in the art for performing anti-lock brake control of vehicle wheels is performed. If at block 216 neither of the front wheels is in ABS, then the routine continues to block 218 where the value Rabs, which tracks rear ABS only events, is incremented. At block 220, Rabs is compared to the predetermined constant Krabs and if Rabs is not greater than Krabs, then the routine continues to block 224. If at block 220, Rabs is greater than Krabs, it indicates that the rear brakes are entering ABS often and the rear brake tables are too "aggressive." In this event, the routine moves to block 222 where the rear tables are reinitiated from the ROM and sets the auto-calibration flag to false.

A constant Kdb is predetermined so that when DB equals Kdb, the brakes are thought to be operating at the nominal temperature. At block 226, the routine compares DB to Kdb and continues to block 230 if DB is less than or equal to Kdb. If, at block 226, Kdb is not less than or equal to Kdb, then the routine moves to block 228 where the product of Tpos (determined at block 212) multiplied by a predetermined heat nominalizing constant, Kheat, is subtracted from DB. This decreases DB back to the nominal value in steps with each brake apply.

At block 230, the routine begins a series of tests to determine if the rear brake table is to be adaptively modified. The rear brake table is adaptively modified only under select brake conditions. If the braking is not in the select conditions, the rear brake table adaptive modification is bypassed and the routine continues straight to the proportional/derivative control loop at block 362. At block 230, the routine checks the an auto-calibration flag, continues to block 362 if the auto-calibration flag is set to false and continues to block 232 if the auto-calibration flag is set to true. The auto-calibration flag is set to true when a successful wheel speed normalization calibration has occurred and is otherwise set to false.

At block 232 the normalized wheel speeds of each of the four vehicle wheels are updated responsive to the effects of vehicle weight shift during braking according to the method described in the copending application, 08/513,192.

Block 234 determines if the vehicle speed is in a predetermined range, for example, between 12 and 80 miles per hour, and, if not, continues to block 362. At block 236, the routine compares Tpos to the value of Tpos during the preceding loop of the control routine. If the values are not the same, the routine continues to block 238 where the values Wadj1 and Wadj2 are set to zero and then continues to block 362.

If at block 236, Tpos is the same as Tpos during the preceding loop of the routine, the routine moves to block 240 where it compares the steering wheel angle to a predetermined threshold, Kturn. If the steering angle is greater than Kturn, the routine moves to block 244 where it determines if the value Vdelta (computed at block 274) is negative to test for rear brake bias. Since the radius of travel around the center of a rum is smaller for the rear wheels than for the front wheels, rear brake torque is reduced if Vdelta is positive. Thus, if at block 244 Vdelta is negative, the routine continues to block 362. If at block 244, Vdelta is not negative, the routine continues to block 248, where the rear motor position command MPOS is reduced according to:

$$MPOS=MPOS-((Ksteer)*(Asteer*Vveh)),$$

where Ksteer is a constant representing a motor position reduction of the rear actuators as a function of steering angle and vehicle speed and Asteer is the steering wheel angle. This reduction in the rear motor position command leads to an elimination of steering-induced rear bias conditions. From block 248, the routine moves to block 362.

From block 240, if the steering wheel angle is not greater than Kturn, then the routine moves to block 252, where each of the wheel speeds is summed for three consecutive loops of the routine to determine Slfspd, Srfspd, Slrspd and Srrspd, which are the wheel speed sums for the left front, right front, left rear and right rear wheels, respectively. The routine then moves to block 254 where, for each wheel, the difference between the immediately preceding wheel speed sum and the current wheel speed sum is compared to the product of Kjitter*Vveh, where Kjitter is a constant. Block 254 tests to determine if the vehicle is on a bumpy road in which the suspension movement of the wheels interferes with the wheel speed information. The test at block 254 may also be responsive to deformable roads, such as gravel, sand, snow and puddles and to very low coefficient of friction surfaces such as ice. These road surface types also might interfere with wheel speed information for purposes of rear brake table calibration. If at block 254, for any of the vehicle wheels, the difference between the immediately preceding wheel speed sum and the current wheel speed sum is greater than the product Kjitter*Vveh, the routine continues to block 362, otherwise, the routine continues to block 258, At block 258, the routine compares the sum of the left front and rear wheel speed sums to the sum of the right front and rear wheels speed sums and, if the difference between the two sums is greater than a product Klftrt*Vveh, where Klftrt is a constant, then the routine continues to block 362. Otherwise the routine continues to block 262. Step 258 tests whether the vehicle is undergoing lateral acceleration causing rolling radius change of the right and/or left vehicle wheels. Step 258 might also detect whether the vehicle is on a split coefficient of friction road surface, that is whether the left vehicle wheels are on one type of road surface while the right vehicle wheels are on another, which may interfere with wheel speed information for purposes of rear brake table calibration.

Step 262 compares the sum of the front wheel speed sums to the sum of the rear wheel speed sums and, if the difference between the two sums is greater than a product Kfrntrr*Vveh, where Kfrntrr is a constant, the routine continues to block 362. Otherwise the routine continues to block 266. This step tests whether the vehicle is experiencing longitudinal acceleration that causes a rolling radius change of front and/or rear vehicle wheels. Block 262 may also test whether the vehicle is experiencing a change of road surface, for example, from a high coefficient of friction road surface to a low coefficient of friction surface, such as may occur when the vehicle enters bumps, gravel, sand, snow, ice and puddles, which may also interfere with wheel speed information for purposes of updating the brake command table.

Beginning at block 270, the routine determines if the rear brake table is to be modified. In general the modification of the rear brake table occurs if wheel slip during braking is higher than the dead band DB and higher than an adaptive dead band DDB. At block 270, the routine determines a value Vdelta according to:

$$Vdelta=(Slfspd+Srfspd)-(Slrspd+Srrspd).$$

Block 274 compares Vdelta to DB and if Vdelta is not greater than DB, the routine continues to block 362. If at block 274, Vdelta is greater than DB, the routine moves to block 278, where it determines the wheel speed noise adaptive dead band, DDB, according to:

$$DDB=DB+(Kdb*Tpos),$$

where Kdb is a predetermined constant. The wheel speed noise adaptive dead band increases with higher vehicle decelerations. Block 282 compares Vdelta to the adaptive dead band DBB and if Vdelta is not greater than DBB, the routine continues to block 362. If at block 282 Vdelta is greater than DDB, the routine continues to block 286 where the adaptive update of the rear brake table begins.

Blocks 286 and 290 limit Vdelta, for purposes of table adaptive updating, to a predetermined value Kmaxdb. If at block 286 Vdelta is not greater than Kmaxdb, then the routine moves to block 294. If at block 286 Vdelta is greater than Kmaxdb, the routine moves to block 290 where Vdelta is limited to Kmaxdb.

Block 294 updates two accumulators Wadj1 and Wadj2 according to:

$$Wadj1=Vdelta*Rperc+Wadj1, \text{ and}$$

$$Wadj2=Vdelta*(1-Rperc)+Wadj2.$$

The accumulators Wadj1 and Wadj2 control updating of the rear brake table in RAM. At block 298 if Wadj1 is not greater than or equal to 1, the update of the RAM table value Mpos(Tpos) is bypassed and the routine continues to block 306. If at block 298, Wadj1 is greater than or equal to 1 the routine continues to block 302 where the RAM table value Mpos(Tpos) is updated according to:

$$Mpos(Tpos)=Mpos(Tpos)+Wadj1.$$

At block 306, if Wadj2 is not greater than or equal to 1, the update of the RAM table value Mpos(Tpos+1) is bypassed and the routine continues to block 314. If at block 306, Wadj2 is greater than or equal to 1, the routine continues to block 310, where the RAM table value Mpos(Tpos+1) is updated according to:

$$Mpos(Tpos+1)=Mpos(Tpos+1)+Wadj2.$$

Beginning at block 314, the routine starts updating the remainder of the RAM table and tests the transfer function of the table versus a nominal table function, Knom, stored in memory. In updating the remainder of the table, the new motor position commands Mpos(Tpos) and Mpos(Tpos+1) are used as a point of reference and the nominal table function is used as a curve to fit or adjust the remainder of the table to the motor position commands that are the point of reference. The transfer function of Knom is that of either drum brakes or disc brakes, whichever is used for the rear brakes. The shape of a pressure versus position curve for a typical drum brake has the lowest pressure increase per position increase at the beginning of the curve. For example a change of one count at table position ten may be equivalent to a change of forty counts at table position one. The shape of pressure versus position for a typical disc brake is more aggressive than the typical drum brake. The table shaping starts at the table position Tpos+1 and compares the difference between each pair of consecutive table values to the nominal table Kcrv. Block 314 begins this by performing the comparison:

*Mpos(Tpos+1)–Mpos(Tpos)>Knom(Tpos)\*Kcrv?* where Kcrv is a predetermined constant. If the test not true at block 314, then the table does not need further adjustment at the position Tpos and the routine moves to block 322. If the test is true at block 314, the routine moves to block 318 where the RAM table is adjusted at position Tpos according to:

*Mpos(Tpos)=Mpos(Tpos+1)–Knom(Tpos)\*Kcrv.*

Block 322 then subtracts one from Tpos and block 326 then returns the routine to block 314 if Tpos does not equal zero so that the remainder of the table below the original Tpos is updated.

Starting at block 330, the remainder of the table above the original Tpos is updated. Block 330 determines values Sep and Reasn according to:

*Sep=Mpos(Tpos)+Knom(Tpos),* and

*Reasn=Mpos(Tpos)+Knom(Tpos)\*Kreasn,* where Kreasn is a predetermined constant. Block 334 compares Tpos to Klast, which is the highest value Tpos can be (the highest table position). If Tpos is greater than or equal to Klast, then the routine continues to block 358. Otherwise the routine continues to block 338 where the value Sep is compared to Mpos(Tpos+1). If at block 338, Sep is greater than Mpos(Tpos+1), then block 342 sets Mpos(Tpos+1) to Sep. The routine then continues to block 346 where Mpos (Tpos+1) is compared to the value Reasn. If Mpos(Tpos+1) is greater than Reasn, then block 350 sets Mpos(Tpos+1) equal to Reasn. Block 354 then increments Tpos and the routine returns to block 330. The routine loops through blocks 330 to 354 until the entire table is updated, at which time the test at block 334 will be passed and the routine continues to block 358.

At block 358, the routine sets the table position zero, Mpos(0), which is the adaptive motor position offset. Block 358 computes Mpos(0) according to:

*Mpos(0)=Mpos(1)\*Konset,* where Konset is a value between zero and one set so that Mpos(0) is the approximate actuator position at which the application of brake torque begins.

Blocks 362 represents a standard proportional and derivative control loop of a type known to those skilled in the art for control of the actuator motor and block 366 outputs the motor current command to bring the actuator motor to the commanded position.

While the above described example uses three brake actuators to control the braking, one for each front wheel and one that simultaneously controls braking for both rear wheels, this invention may also be implemented in a vehicle with four brake actuators, one for controlling the brake of each wheel. The operation of the four brake actuator braking system, according to the invention, operates as described above with the exception that instead of a single command being developed for the rear wheels responsive to the sum of the rear wheel speed, a brake command is developed for each rear wheel responsive to that rear wheel's speeds and the average of the front wheel speeds. Those skilled in the art can readily adapt the above example described with respect to FIGS. 1–5B, according to the information provided herein, to implement the four brake actuator example of this invention. If four brake actuators are implemented, the control of U.S. patent application, Ser. No. 08/195,225, now U.S. Pat. No. 5,539,641, assigned to the assignee of this invention, may be used.

We claim:

1. An adaptive brake control method for use in a motor vehicle comprising the steps of:

storing a brake position command table in memory;

receiving an operator brake input from a brake pedal;

responsive to the brake pedal and the command table, determining a brake position command;

outputting the brake position command to a vehicle rear brake of a rear vehicle wheel;

measuring a first wheel speed of a front vehicle wheel;

measuring a second wheel speed of the rear vehicle wheel;

comparing the first and second wheel speeds;

determining a modification to the brake position command responsive to the comparison; and storing the modification of the brake position command in the brake position command table in memory, wherein the brake position command table is adaptively updated and a front to rear brake proportioning of the vehicle is adaptively controlled.

2. The adaptive brake control method of claim 1, further comprising the step of:

after storing the modification of the brake position command in the brake position command table in memory, updating a remainder of the brake position command table responsive to the modification of the brake position command and a predetermined table function.

3. An adaptive brake control method for a motor vehicle with first and second front vehicle wheels and third and fourth rear vehicle wheels, the adaptive brake control method having a first non-braking mode and a second braking mode, wherein the first non-braking mode operates according to the steps of:

normalizing first and second front wheel speeds of the first and second front vehicle wheels;

normalizing third and fourth rear wheel speeds of the third and fourth rear vehicle wheels; and, wherein the second braking mode operates according to the steps of:

receiving an operator input brake command;

responsive to a brake command function stored in memory and the operator input brake command, developing a rear brake position command;

outputting the rear brake position command to a rear brake actuator;

monitoring the normalized first and second front wheel speeds and the normalized third and fourth rear wheel speeds;

responsive to the monitored normalized first and second front wheel speeds and the normalized third and fourth rear wheel speeds, updating the brake command function stored in memory, wherein the brake command is adaptively updated and a front to rear brake proportioning of the vehicle is adaptively controlled so that a difference between the front and rear wheel speeds is minimized.

4. The adaptive brake control method of claim 3, wherein the step of updating the brake command function stored in memory comprises the sub-steps of:
   determining a difference between the normalized first and second front wheel speeds and the normalized third and fourth rear wheel speeds;
   determining a command adjustment actor responsive to the difference;
   summing the command adjustment actor with the rear brake position command to determine an adapted brake position command;
   determining an adapted brake command function responsive to the adapted brake position command; and
   storing the adapted brake command function in the memory.

5. An adaptive brake control method for a motor vehicle with first and second front vehicle wheels and third and fourth rear vehicle wheels, the adaptive brake control method having a first non-braking mode and a second braking mode, wherein the first non-braking mode operates according to the steps of:
   normalizing first and second front wheel speeds of the first and second front vehicle wheels;
   normalizing third and fourth rear wheel speeds of the third and fourth rear vehicle wheels; and, wherein the second braking mode operates according to the steps of:
   receiving an operator input brake command;
   responsive to a brake command table stored in memory and the operator input brake command, developing a rear brake position command;
   outputting the rear brake position command to a rear brake actuator;
   monitoring the normalized first and second front wheel speeds and the normalized third and fourth rear wheel speeds;
   responsive to the monitored normalized first and second front wheel speeds and the monitored normalized third and fourth rear wheel speeds, modifying the brake position command; and
   replacing, in the brake command table stored in memory, the rear brake position command with the modified brake position command, wherein the brake position command table is adaptively updated and a front to rear brake proportioning of the vehicle is adaptively controlled.

6. The adaptive brake control method of claim 5, wherein the second braking mode additionally comprises the step of:
   updating a remainder of the brake command table responsive to the modified brake position command and a predetermined table function.

7. In a motor vehicle with from and rear wheels, an adaptive brake control method according to the steps of:
   storing in a memory a table comprising a plurality of motor position commands indexed in consecutive table positions and conforming to a predetermined table function;
   receiving a brake pedal input;
   determining a first table position responsive to the brake pedal input;
   selecting from the plurality of motor position commands, a first motor position command corresponding to the selected first table position;
   determining a rear brake position command responsive to the first motor position command;
   commanding a vehicle rear brake responsive to the rear brake position command;
   measuring wheel speeds of the front and rear wheels;
   modifying the first motor position command responsive to the measured wheel speeds;
   storing in the table, at the first table position, the modified first motor position command; and
   modifying a remainder of the plurality of motor position commands in a remainder of the table positions responsive to the modified first motor position command and the predetermined table function, wherein the table is adaptively updated and a front to rear brake proportioning of the motor vehicle is adaptively controlled so that a difference between the front and rear wheel speeds is minimized.

8. In a motor vehicle with front and rear wheels and in which a brake command is determined responsive to a brake pedal input, an adaptive brake control method according to the steps of:
   storing in a memory a table comprising a plurality of motor position commands indexed in consecutive table positions and conforming to a predetermined table function;
   determining a first table position responsive to the ratio of the brake command and a predetermined constant;
   selecting a second table position equal to the first table position plus one;
   selecting from the plurality of motor position commands, a first motor position command corresponding to the selected first table position;
   selecting from the plurality of motor position command, a second motor position command corresponding to the selected second table position;
   determining a rear brake position command responsive to the ratio and the first and second motor position commands;
   commanding a vehicle rear brake responsive to the rear brake position command;
   measuring wheel speeds of the front and rear wheels;
   modifying the first motor position command responsive to the measured wheel speeds;
   modifying the second motor position command responsive to the measured wheel speeds;
   storing in the table, at the first table position, the modified first motor position command;
   storing in the table, at the second table position, the modified second motor position command; and
   modifying a remainder of the plurality of motor position commands in a remainder of the table positions responsive to the modified first and second motor position commands and the predetermined table function, wherein the table is adaptively updated and a front to rear brake proportioning of the motor vehicle is adaptively controlled so that a difference between the front and rear wheel speeds is minimized.

9. In a vehicle with a controller, front and rear brakes and front and rear wheels, an adaptive brake control method performed by the controller comprising the steps of:
   determining front brake commands according to a first function;
   determining rear brake commands according to a second brake function;

applying the front and rear brake commands to the front and rear brakes;

monitoring wheel speeds of the front and rear vehicle wheels;

responsive to the monitored wheel speeds, maintaining a count of a number of times that either of the rear wheels obtain a slip value above a threshold value when the front wheels are not yet slipping;

adjusting the second brake function if the count passes a predetermined threshold, wherein an amount of rear brake bias is adaptively reduced when the rear wheels consistently tend to slip before the front wheel slip.

10. An adaptive brake control method for a motor vehicle with first and second front vehicle wheels and third and fourth rear vehicle wheels, the adaptive brake control method according to the steps of:

receiving an operator input brake command;

responsive to a brake command function stored in memory and the operator input brake command, developing a rear brake position command;

outputting the rear brake position command to a rear brake actuator;

monitoring the first and second front wheel speeds and the third and fourth rear wheel speeds; and responsive to the monitored first and second front wheel speeds and the third and fourth rear wheel speeds, updating the brake command function stored in memory, wherein the brake command is adaptively updated and a front to rear brake proportioning of the vehicle is adaptively controlled so that a difference between the front and rear wheel speeds is minimized.

* * * * *